(12) United States Patent
Lee et al.

(10) Patent No.: US 10,868,309 B2
(45) Date of Patent: Dec. 15, 2020

(54) POSITIVE ELECTRODE ACTIVE MATERIAL PARTICLE INCLUDING CORE CONTAINING LITHIUM COBALT OXIDE AND COATING LAYER CONTAINING BORON AND FLUORINE, AND PREPARATION METHOD THEREOF

(71) Applicant: LG Chem, Ltd., Seoul (KR)

(72) Inventors: Bo Ram Lee, Daejeon (KR); Sung Bin Park, Daejeon (KR); Young Uk Park, Daejeon (KR); Chi Ho Jo, Daejeon (KR); Hyuck Hur, Daejeon (KR); Wang Mo Jung, Daejeon (KR)

(73) Assignee: LG Chem, Ltd.

( * ) Notice: Subject to any disclaimer, the term of this patent is extended or adjusted under 35 U.S.C. 154(b) by 82 days.

(21) Appl. No.: 15/770,102

(22) PCT Filed: Mar. 30, 2017

(86) PCT No.: PCT/KR2017/003476
§ 371 (c)(1),
(2) Date: Apr. 20, 2018

(87) PCT Pub. No.: WO2017/171425
PCT Pub. Date: Oct. 5, 2017

(65) Prior Publication Data
US 2018/0316015 A1    Nov. 1, 2018

(30) Foreign Application Priority Data

Mar. 31, 2016 (KR) .................. 10-2016-0038865

(51) Int. Cl.
*H01M 4/36* (2006.01)
*H01M 4/525* (2010.01)
(Continued)

(52) U.S. Cl.
CPC ............ *H01M 4/628* (2013.01); *C01G 51/00* (2013.01); *C01G 51/42* (2013.01); *H01M 2/10* (2013.01);
(Continued)

(58) Field of Classification Search
CPC .......... H01M 2/10; H01M 4/36; H01M 4/366; H01M 4/525; H01M 4/628;
(Continued)

(56) References Cited

U.S. PATENT DOCUMENTS 6,756,155 B1   6/2004  Kweon et al.
8,383,077 B2   2/2013  Thackeray et al.
(Continued)

FOREIGN PATENT DOCUMENTS

CN     101901907 A    12/2010
CN     102623694 A    8/2012
(Continued)

OTHER PUBLICATIONS

English translation of KR Publication 10-2015-0137888, Dec. 2015.*
(Continued)

*Primary Examiner* — Brittany L Raymond
(74) *Attorney, Agent, or Firm* — Lerner, David, Littenberg, Krumholz & Mentlik, LLP

(57) ABSTRACT

Provided is a positive electrode active material particle including a core containing lithium cobalt oxide represented by the following Chemical Formula 1; and a coating layer containing boron (B) and fluorine (F), which is coated on the surface of the core:

$$Li_{1+x}Co_{1-x}O_2 \quad (1)$$

21 Claims, 4 Drawing Sheets

(51) Int. Cl.
  *H01M 4/62*     (2006.01)
  *H01M 10/0525*  (2010.01)
  *H01M 10/0568*  (2010.01)
  *C01G 51/00*    (2006.01)
  *H01M 2/10*     (2006.01)
  *H01M 4/02*     (2006.01)

(52) U.S. Cl.
  CPC ............ *H01M 4/36* (2013.01); *H01M 4/366* (2013.01); *H01M 4/525* (2013.01); *H01M 10/0525* (2013.01); *H01M 10/0568* (2013.01); *C01P 2004/03* (2013.01); *C01P 2004/80* (2013.01); *C01P 2006/40* (2013.01); *H01M 2004/028* (2013.01); *Y02E 60/122* (2013.01); *Y02T 10/7011* (2013.01)

(58) Field of Classification Search
  CPC ....... H01M 2004/028; H01M 10/0525; H01M 10/0568; C01G 51/00; C01G 51/42; C01P 2006/40; C01P 2004/03; C01P 2004/80
  See application file for complete search history.

(56) References Cited

U.S. PATENT DOCUMENTS

| | | | |
|---|---|---|---|
| 2008/0038637 A1* | 2/2008 | Minami | H01M 4/131 429/231.3 |
| 2013/0101893 A1 | 4/2013 | Dai et al. | |
| 2014/0272563 A1 | 9/2014 | Dai et al. | |
| 2015/0030927 A1 | 1/2015 | Kwak et al. | |
| 2015/0104704 A1 | 4/2015 | Kim et al. | |
| 2015/0349333 A1 | 12/2015 | Park et al. | |
| 2016/0013476 A1 | 1/2016 | Oh et al. | |
| 2016/0036043 A1 | 2/2016 | Dai et al. | |
| 2016/0164078 A1 | 6/2016 | Hong et al. | |

FOREIGN PATENT DOCUMENTS

| | | | |
|---|---|---|---|
| CN | 102637894 A | | 8/2012 |
| CN | 102723459 A | | 10/2012 |
| CN | 103000880 A | | 3/2013 |
| CN | 103022499 A | | 4/2013 |
| CN | 103066282 A | | 4/2013 |
| CN | 103137961 A | | 6/2013 |
| CN | 103762334 A | | 4/2014 |
| JP | 2006190687 A | | 7/2006 |
| JP | 2014002984 A | | 1/2014 |
| JP | 2014120202 A | | 6/2014 |
| JP | 5793411 B2 | | 10/2015 |
| KR | 20140018137 A | | 2/2014 |
| KR | 101409837 B1 | | 6/2014 |
| KR | 20140072119 A | | 6/2014 |
| KR | 101465490 B1 | | 11/2014 |
| KR | 10-2014-0140906 | * | 12/2014 |
| KR | 20150013077 A | | 2/2015 |
| KR | 20150050458 A | | 5/2015 |
| KR | 101547919 B1 | | 9/2015 |
| KR | 10-2015-0137888 | * | 12/2015 |
| KR | 20150137888 A | | 12/2015 |
| KR | 20150141254 A | | 12/2015 |
| KR | 101595562 B1 | | 2/2016 |
| KR | 10-2016-0026402 | * | 3/2016 |
| KR | 20160026402 A | | 3/2016 |
| WO | 2012036372 A2 | | 3/2012 |
| WO | WO 2012-036372 | * | 3/2012 |
| WO | 2013060078 A1 | | 5/2013 |

OTHER PUBLICATIONS

English translation of KR Publication 10-2016-0026402, Mar. 2016.*
English translation of KR Publication 10-2014-0140906, Dec. 2014.*
Chagnes et al., "Electrolyte and Solid-Electrolyte Interphase Layer in Lithium-Ion Batteries", Lithium Ion Batteries—New Developments, INTECH, Feb. 24, 2012 , pp. 145-173, XP055502358.
Extended European Search Report including Written Opinion for Application No. EP17775849.7 dated Sep. 4, 2018.
Meng Hu et al., "Effect of lithium difluoro(oxalate)borate (LiDFOB) additive on the performance of high-voltage lithium-ion batteries", Journal of Applied Electrochemistry, Mar. 23, 2012, vol. 42, No. 5, pp. 291-296, XP35040409.
Sun et al., "Significant improvement of high voltage cycling behavior AlF3-coated LiCoO2 cathode", Electrochemistry Communications, Mar. 28, 2006, vol. 8, No. 5, pp. 821-826, XP28041531.
Wu Qingliu et al., "Effects of lithium difluoro(oxalate)borate on the performance of Li-rich composite cathode in Li-ion battery", Electrochemistry Communications, Aug. 23, 2012, vol. 24, pp. 78-81, XP028945536.
Ye Zhu et al., "Positive Electrode Passivation by LiDFOB Electrolyte Additive in High-Capacity Lithium-Ion Cells", Journal of the Electrochemical Society, Oct. 20, 2012, vol. 159, No. 12, pp. A2109-A2117, XP55502488.
International Search Report for PCT/KR2017/003476 dated Jul. 4, 2017.
Leroy S, Martinez H, Dedryvére R, Lemordant D, Gonbeau D. Influence of the lithium salt nature over the surface film formation on a graphite electrode in Li-ion batteries: An XPS study. Applied surface science. Mar. 30, 2007;253 (11):4895-905. XP55738444, Amsterdam, NL ISSN: 0169-4332, DOI: 10.1016/j.apsusc.2006.10.071.

* cited by examiner

POSITIVE ELECTRODE ACTIVE MATERIAL PARTICLE INCLUDING CORE CONTAINING LITHIUM COBALT OXIDE AND COATING LAYER CONTAINING BORON AND FLUORINE, AND PREPARATION METHOD THEREOF

TECHNICAL FIELD

The present application is based on, and claims priority from, Korean Patent Application No. 10-2016-0038865, filed on Mar. 31, 2016, the disclosure of which is hereby incorporated by reference herein in its entirety.

The present invention relates to a positive electrode active material particle including a core containing lithium cobalt oxide and a coating layer containing boron and fluorine, and a preparation method thereof.

BACKGROUND ART

As technology development and demands for mobile devices increase, demands for secondary batteries as energy sources are rapidly increasing. Among the secondary batteries, lithium secondary batteries having high energy density and working potential, a long cycle life, and a low self-discharge rate have been commercialized and widely used.

Further, with growing concerns about environmental issues, many researches have been conducted on electric vehicles and hybrid electric vehicles which may be employed in place of fossil fuel-based vehicles such as gasoline vehicles, diesel vehicles, etc., which are one of major causes of air pollution. Although nickel-metal hydride secondary batteries have been mainly used as power sources for such electric vehicles and hybrid electric vehicles, use of lithium secondary batteries having high energy density and discharge voltage has been actively studied, and some of them are in a commercialization stage.

As a positive electrode material for the lithium secondary battery, $LiCoO_2$, a ternary system material (NMC/NCA), $LiMnO_4$, $LiFePO_4$, etc. is currently used. Of them, $LiCoO_2$ has problems in that cobalt is expensive and $LiCoO_2$ has low capacity at the same voltage, as compared with ternary system materials. Therefore, use of ternary system materials is gradually increasing in order to increase the capacity of secondary batteries.

However, $LiCoO_2$ has been widely used until now, because it has advantages of high rolling density, etc. To develop high-capacity secondary batteries, studies are conducted to increase an operating voltage.

When a high voltage is applied to lithium cobalt oxide in order to achieve high capacity, Li usage of $LiCoO_2$ is increased, which may increase possibility of surface instability and structural instability.

Accordingly, it is highly necessary to develop a lithium cobalt oxide-based positive electrode active material which may be stably used at high voltages.

DISCLOSURE

Technical Problem

An object of the present invention is to solve the above-described problems of the prior art and the technical problems which have been demanded to be solved.

The present inventors have conducted intensive studies and various experiments, and as described below, they found that when a positive electrode active material particle includes a core containing lithium cobalt oxide represented by $Li_{1+x}Co_{1-x}O_2$ ($-0.03 \leq x \leq 0.1$); and a coating layer containing boron (B) and fluorine (F), which is coated on the surface of the core, surface stability of the positive electrode active material particle may be improved, side reactions on the surface of the positive electrode active material may be reduced, and high-temperature lifetime characteristic may be improved, thereby completing the present invention.

Technical Solution

Accordingly, a positive electrode active material particle for secondary batteries according to the present invention is characterized by including a core containing lithium cobalt oxide represented by the following Chemical Formula 1; and a coating layer containing boron (B) and fluorine (F), which is coated on the surface of the core:

$$Li_{1+x}Co_{1-x}O_2 \quad (1)$$

wherein $-0.03 \leq x \leq 0.1$.

As described above, when the coating layer containing boron and fluorine is included, although electrolyte salts are decomposed, decomposition products react with boron or fluorine on the surface of the positive electrode active material particle to be converted into less reactive materials, thereby suppressing side reactions such as electrolyte decomposition on the surface of the positive electrode active material particle.

In a specific embodiment, in the coating layer, boron and fluorine may exist in a state in which they are chemically bonded with lithium.

Further, the boron and fluorine may exist in a state in which they are chemically bonded with lithium of the core. In the core, lithium may exist in an excessive amount, and therefore, lithium of the core may form a chemical bond with boron and fluorine of the coating layer. As such, when the boron and fluorine form a chemical bond with the lithium of the core, binding strength between the core and the coating layer may be further improved, thereby further increasing the surface stability.

Meanwhile, the boron and fluorine may exist in a compound of forming a chemical bond with lithium, independently of the core. In this case, the compound in which lithium, boron, and fluorine are chemically bound with each other, independently of the coating layer, may be dissolved into the electrolyte and may act as a kind of additive with respect to the electrolyte, thereby improving high-temperature lifetime characteristics.

Specifically, the boron and fluorine, together with lithium, may exist as $LiBF_4$.

In a specific embodiment, a weight of the coating layer may be 0.5% by weight to 5% by weight, and specifically, 1% by weight to 3% by weight with respect to a weight of the core. If the weight of the coating layer is less than 0.5% by weight with respect to the weight of the core, the effect of stabilizing the surface of the coating layer is not sufficient, and therefore, improvement of performances is not satisfactory. If the weight of the coating layer is more than 5% by weight with respect to the weight of the core, the weight of the core is relatively low, and therefore, energy density, etc. may be reduced.

In a specific embodiment, the positive electrode active material particle may exhibit a capacity retention rate of 90% or more, specifically 91%, as measured in a coin-type half cell at an upper voltage limit of 4.5 V at 45° C. during 50 cycles.

Further, the present invention provides a method of preparing the positive electrode active material particle for second batteries.

The preparation method may include the processes of:

(a) preparing a first lithium cobalt oxide represented by the following Chemical Formula 2;

$$Li_{1+y}Co_{1-y}O_2 \quad (2)$$

(wherein $-0.03 \leq y \leq 0.1$)

(b) dry-mixing the first lithium cobalt oxide and a first compound including all of boron and fluorine, or dry-mixing the first lithium cobalt oxide, a second compound including boron, and a third compound including fluorine; and (c) heat-treating the mixture after the dry-mixing of the process (b).

In a specific embodiment, the preparation method is characterized in that the positive electrode active material particle includes the core containing lithium cobalt oxide represented by the following Chemical Formula 1; and the coating layer containing boron and fluorine, which is coated on the surface of the core:

$$Li_{1+x}Co_{1-x}O_2 \quad (1)$$

wherein $-0.03 \leq x \leq 0.1$.

That is, it may be understood that part of an excessive amount of lithium in lithium cobalt oxide represented by Chemical Formula 2 reacts with boron and fluorine to form at least part of the coating layer of the positive electrode active material particle. Therefore, the content of lithium in the core represented by Chemical Formula 1 may be lower than that of lithium in lithium cobalt oxide represented by Chemical Formula 2.

Specifically, y may be determined under condition where a ratio (molar ratio) of $Li_{1+y}$ to $Co_{1-y}$ is larger than a ratio (molar ratio) of $Li_{1+x}$ to $Co_{1-x}$. For example, y may satisfy $0.01 \leq y \leq 0.1$.

In a specific embodiment, y may satisfy $0.03 \leq y \leq 0.07$. When y is out of this range, the content of the coating layer in the positive electrode active material particle is excessively increased, and therefore, energy density may be decreased, or the coating layer may be formed too thin, thereby reducing the surface-stabilizing effect.

Meanwhile, the first compound may be one or more selected from the group consisting of $NH_4BF_4$, $NaBF_4$, $(CH_3)_3O(BF_4)$, $(C_2H_5)_4N(BF_4)$, $(C_6H_5)_3C(BF_4)$, $(CH_3)_4N(BF_4)$, $(CH_3CH_2CH_2)_4N(BF_4)$, and $C_3H_{10}BF_4P$, and the second compound may be one or more selected from the group consisting of $B_2O_3$, $H_3BO_3$, $(C_6H_5O)_3B$, $B_2H_4O_4$, $C_6H_5B(OH)_2$, $CH_3OC_6H_4B(OH)_2$, and $C_6H_{12}BNO_3$.

The third compound may be one or more selected from the group consisting of $NH_4HF_2$, $NH_4F$, $(CH_3)_4NF$, $(CH_3CH_2)_4NF$, PVdF (polyvinylidene fluoride), PVdF-HFP (poly(vinylidene fluoride-co-hexafluoropropylene)), PVF (polyvinyl fluoride), PTFE (polytetrafluoroethylene), and ETFE (ethylene tetrafluoroethylene).

In a specific embodiment, the dry-mixing of the process (b) may be performed by high energy milling.

The heat treatment of the process (c) may be performed at 300° C. to 600° C., and specifically, at 450° C. to 500° C.

The heat treatment of the process (c) may be performed for 3 hours to 7 hours.

Further, the present invention provides a secondary battery including a positive electrode including the positive electrode active material particle, a negative electrode, and an electrolyte.

In a specific embodiment, the electrolyte includes $LiPF_6$ as a lithium salt, and $PF_5$ which is a decomposition product of $LiPF_6$ reacts with the coating layer of the positive electrode active material particle to be converted into $PF_6^-$ which is a less reactive anion than $PF_5$. Specifically, $LiPF_6$ included in the electrolyte may be decomposed into LiF and $PF_5$, which may generate HF in the electrolyte to damage the surface of the positive electrode material. As a result, reduction in the lifetime characteristics of the secondary battery may be caused. As in the present invention, $LiBF_4$ included in the coating layer of the positive electrode active material particle forms $BF_4^-$, which is allowed to react with unstable $PF_5$ to be converted into a less reactive anion $PF_6^-$. Consequently, side reactions on the surface of the positive electrode material may be remarkably reduced.

At least part of the coating layer of the positive electrode active material particle may be dissolved into the electrolyte, and as a result, the dissolved coating layer may act as a kind of additive with respect to the electrolyte, thereby improving high-temperature lifetime characteristics.

Hereinafter, other components of the secondary battery will be described.

The positive electrode may be manufactured, for example, by applying a positive electrode mixture containing the positive electrode active material, a conductive material, and a binder onto a positive electrode collector. If necessary, a filler may be further added to the positive electrode mixture.

The positive electrode collector is generally fabricated in a thickness of 3 μm to 201 μm. The positive electrode collector is not particularly limited, as long as it has high conductivity without causing chemical changes in the battery. For example, one selected from the group consisting of stainless steel, aluminum, nickel, titanium, and aluminum or stainless steel having a surface treated with carbon, nickel, titanium, or silver may be used. Specifically, aluminum may be used. The collector may also be processed to form fine irregularities on the surface thereof so as to enhance adhesive strength to the positive electrode active material. The collector may be used in various forms including films, sheets, foils, nets, porous structures, foams, non-woven fabrics, etc.

The positive electrode active material may further include, in addition to the above positive electrode active material, a layered structure compound such as lithium nickel oxide ($LiNiO_2$), etc., or a compound substituted with one or more transition metals; a lithium manganese oxide such as chemical formula of $Li_{1+x}Mn_{2-x}O_4$ (wherein x is 0~0.33), $LiMnO_3$, $LiMn_2O_3$, $LiMnO_2$, etc.; lithium copper oxide ($Li_2CuO_2$); vanadium oxides such as $LiV_3O_8$, $LiV_3O_4$, $V_2O_5$, $Cu_2V_2O_7$, etc.; a Ni site type lithium nickel oxide represented by chemical formula $LiNi_{1-x}M_xO_2$ (wherein M is Co, Mn, Al, Cu, Fe, Mg, B or Ga, and x is 0.01 to 0.3); a lithium manganese complex oxide represented by chemical formula of $LiMn_{2-x}M_xO_2$ (wherein M is Co, Ni, Fe, Cr, Zn or Ta, and x is 0.01 to 1) or $Li_2Mn_3MO_8$ (wherein M is Fe, Co, Ni, Cu or Zn); $LiMn_2O_4$ wherein some Li of chemical formula is substituted with alkaline earth metals; disulfide compounds; $Fe_2(MoO_4)_3$, etc., but is not limited thereto.

The conductive material is generally added in an amount of 0.1% by weight to 30% by weight based on the total weight of the mixture including the positive electrode active material. The conductive material is not particularly limited, as long as it has conductivity without causing chemical changes in the battery. Examples of the conductive material may include graphite such as natural or artificial graphite; carbon black such as carbon black, acetylene black, Ketjen black, channel black, furnace black, lamp black, thermal black, etc.; conductive fibers such as carbon fibers, metallic fibers, etc.; metallic powders such as carbon fluoride, aluminum, nickel powder, etc.; conductive whiskers such as zinc oxide, potassium titanate, etc.; conductive metal oxides such as titanium oxide, etc.; polyphenylene derivatives, etc.

The binder included in the positive electrode is a component that assists in bonding between the active material and the conductive material and bonding with respect to the collector, and may be generally added in an amount of 0.1% by weight to 30% by weight based on the total weight of the mixture including the positive electrode active material. Examples of the binder may include polyvinylidene fluoride, polyvinyl alcohol, carboxymethyl cellulose (CMC), starch, hydroxypropyl cellulose, regenerated cellulose, polyvinylpyrrolidone, tetrafluoroethylene, polyethylene, polypropylene, ethylene-propylene-diene terpolymer (EPDM), sulfonated EPDM, styrene-butadiene rubber, fluorine rubber, various copolymers, etc.

In a specific embodiment, the separator may be a polyolefin-based film commonly used in the art, and for example, the separator may be a sheet composed of one or more selected from the group consisting of high-density polyethylene, low-density polyethylene, linear low-density polyethylene, ultra-high molecular weight polyethylene, polypropylene, polyethyleneterephthalate, polybutyleneterephthalate, polyester, polyacetal, polyamide, polycarbonate, polyimide, polyetheretherketone, polyethersulfone, polyphenyleneoxide, polyphenylenesulfidro, polyethylenenaphthalene, and mixtures thereof.

The separator may be those composed of the same material, but is not limited thereto. Depending on safety, energy density, and overall performances of the battery, the separator may be also composed of the different materials.

A pore size and porosity of the separator or separation film are not particularly limited, but the porosity may be in the range of 10% to 95%, and the pore size (diameter) may be 0.1 μm to 50 μm. If the pore size and the porosity are less than 0.1 μm and 10%, respectively, the separator may act as a resistance layer. If the pore size and the porosity are more than 50 μm and 95%, respectively, it is difficult to maintain mechanical properties.

The electrolyte may be a non-aqueous electrolyte containing lithium salts, and the non-aqueous electrolyte containing lithium salts is composed of a non-aqueous electrolyte and lithium salt. A non-aqueous organic solvent, an organic solid electrolyte, or an inorganic solid electrolyte may be used as the non-aqueous electrolyte. However, the non-aqueous electrolyte is not limited thereto.

The non-aqueous organic solvent may be, for example, a non-protic organic solvent such as N-methyl-2-pyrrolidone, propylene carbonate, ethylene carbonate, butylene carbonate, dimethyl carbonate, diethyl carbonate, gamma butyrolactone, 1,2-dimethoxy ethane, tetrahydroxy franc, 2-methyl tetrahydrofuran, dimethylsulfoxide, 1,3-dioxolane, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, etc.

The organic solid electrolyte may include, for example, polyethylene derivatives, polyethylene oxide derivatives, polypropylene oxide derivatives, phosphoric acid ester polymer, polyagitation lysine, polyester sulfide, polyvinyl alcohol, polyvinylidene fluoride, a polymer containing ionic dissociation groups, etc.

The inorganic solid electrolyte may include, for example, Li-based nitrides, halides, or sulfates such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, etc.

The lithium salts are readily dissolved in the non-aqueous electrolyte, and may include, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $(CF_3SO_2)_2NLi$, chloroboran lithium, lower aliphatic carboxylic acid lithium, lithium tetraphenyl borate, imides, etc.

In order to improve charge/discharge characteristics and flame retardancy in the non-aqueous electrolyte, for example, pyridine, triethyl phosphite, triethanolamine, cyclic ether, ethylene diamine, n-glyme, hexaphosphoric triamide, nitrobenzene derivatives, sulfur, quinoneimine dyes, N-substituted oxazolidinone, N,N-substituted imidazolidine, ethyleneglycol dialkylether, ammonium salts, pyrrol, 2-methoxy ethanol, aluminum trichloride, etc. may be added. Optionally, halogen-containing solvents such as carbon tetrachloride or ethylene trifluoride may be further added in order to obtain flame resistance, or carbon dioxide gas may be further added in order to enhance high-temperature retention properties, and FEC (Fluoro-Ethylene Carbonate), PRS (Propene sultone), etc. may be further added.

In a specific embodiment, lithium salts such as $LiPF_6$, $LiClO_4$, $LiBF_4$, $LiN(SO_2CF_3)_2$, etc. may be added to a mixed solvent of a cyclic carbonate of EC or PC, which is a highly dielectric solvent, and a linear carbonate of DEC, DMC, or EMC, which is a low viscosity solvent, thereby preparing the lithium salt-containing non-aqueous electrolyte.

Further, the present invention provides a battery pack including the secondary battery, and a device including the battery pack.

The device may be, for example, notebook computers, netbooks, tablet PC, mobile phones, MP3, wearable electronics, power tools, electric vehicles (EV), hybrid electric vehicles (HEV), plug-in hybrid electric vehicles (PHEV), E-bike, E-scooter, electric golf carts, or electric storage systems, etc., but is not limited thereto.

Structures of the devices and a manufacturing method thereof are known in the art, and therefore, specific descriptions thereof will be omitted in the present invention.

DETAILED DESCRIPTION OF THE EMBODIMENTS

Hereinbelow, the present invention will be described with reference to Examples. A better understanding of the present invention may be obtained in light of the following Examples, but are not to be construed to limit the scope of the present invention.

Example 1

Lithium cobalt oxide having an excessive amount of lithium at a molar ratio of Li/Co=1.06 was prepared. 100 parts by weight of lithium cobalt oxide, 1.30 parts by weight of PVdF, and 0.4 parts by weight of $B_2O_3$ were dry-mixed, and then heat-treated at 500° C. for 5 hours to prepare positive electrode active material particles having $LiBF_4$ in a coating layer.

Example 2

Lithium cobalt oxide having an excessive amount of lithium at a molar ratio of Li/Co=1.06 was prepared. 100 parts by weight of lithium cobalt oxide and 1.0 parts by weight of $NH_4BF_4$ were dry-mixed, and then heat-treated at 500° C. for 5 hours to prepare positive electrode active material particles having $LiBF_4$ in a coating layer.

Comparative Example 1

Lithium cobalt oxide having an excessive amount of lithium at a molar ratio of Li/Co=1.05 was used as positive electrode active material particles.

Experimental Example 1

Figure 1:
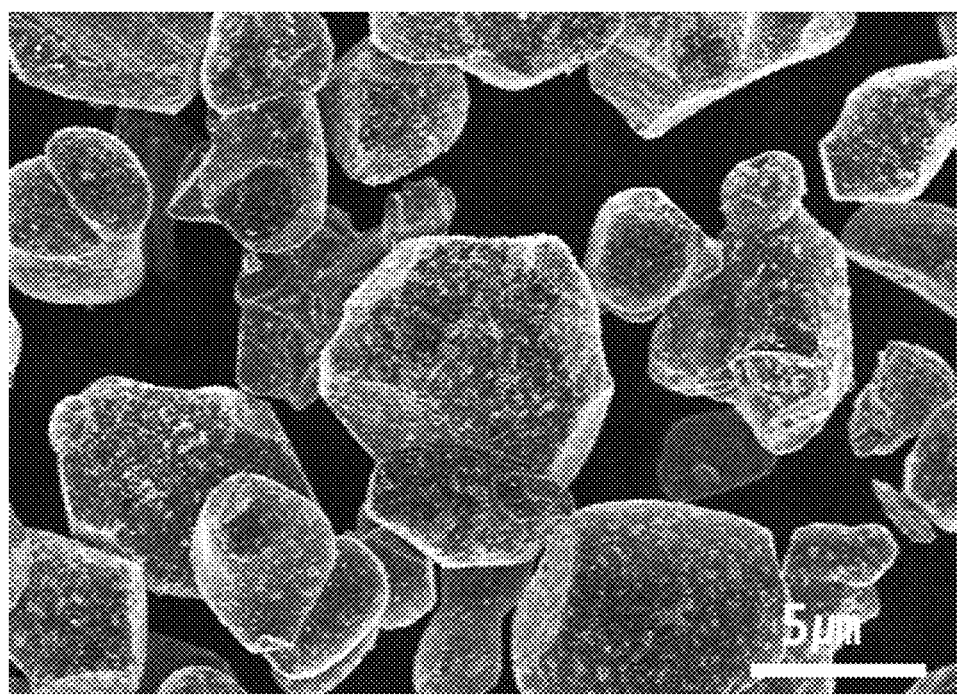
FIG. 1 is an SEM image of a positive electrode active material particle according to Example 1.
Figure 2:
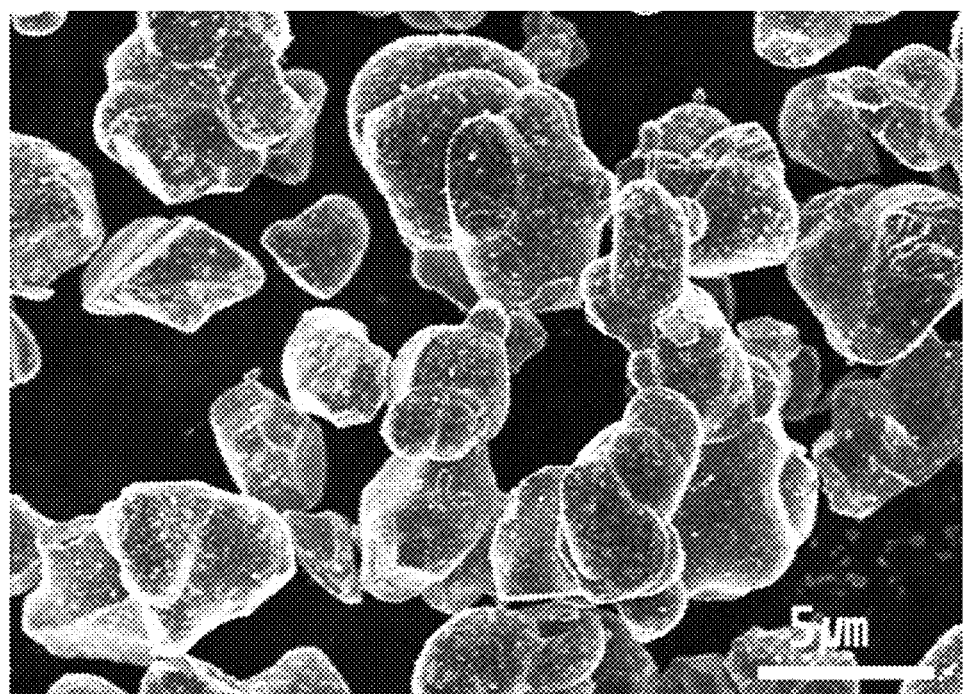
FIG. 2 is an SEM image of a positive electrode active material particle according to Example 2.
Figure 3:
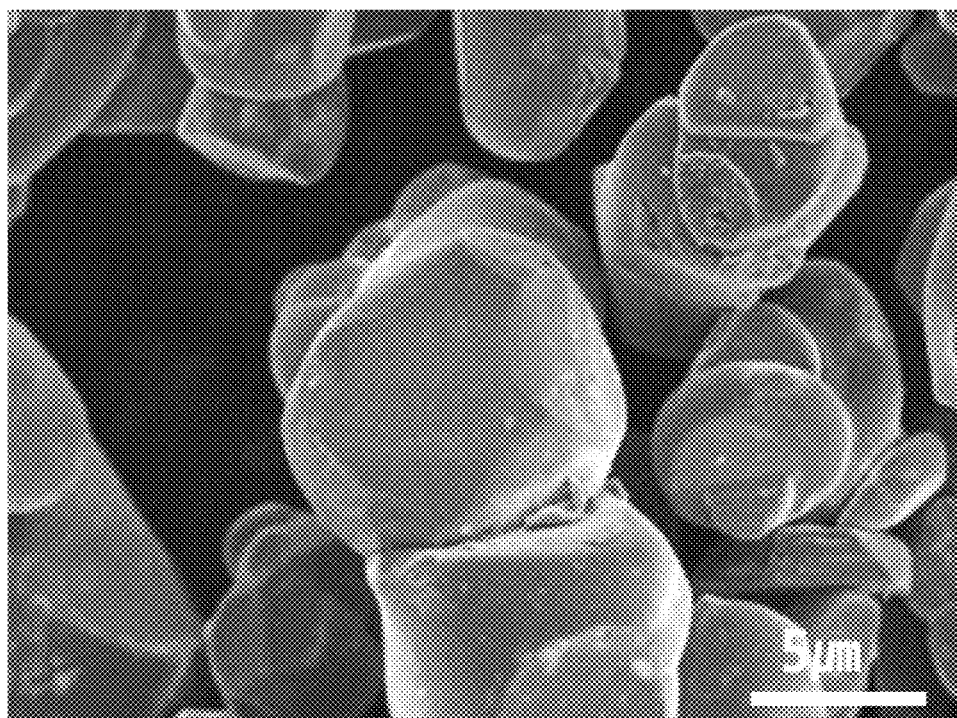
FIG. 3 is an SEM image of a positive electrode active material particle according to Comparative Example 1.

SEM images of the positive electrode active material particles prepared in Examples 1 and 2 and Comparative Example 1 were photographed and shown in FIGS. 1 to 3, respectively.

Referring to FIGS. 1 and 2, as compared with FIG. 3, it was confirmed that coating layers including $LiBF_4$ were formed on the surfaces of the positive electrode active material particles of Examples 1 and 2.

Experimental Example 2

Each of the positive electrode active material particles prepared in Examples 1 and 2 and Comparative Example 1, PVdF as a binder, and natural graphite as a conductive material were used. They were mixed well in NMP at a weight ratio of positive electrode active material:binder: conductive material of 96:2:2, and then the mixture was applied to an Al foil with a thickness of 20 μm, and dried at 130° C. to manufacture a positive electrode. As a negative electrode, a lithium foil was used, and an electrolyte containing 1M $LiPF_6$ in a solvent of EC:DMC:DEC=1:2:1 was used to manufacture respective coin-type half cells.

Figure 4:
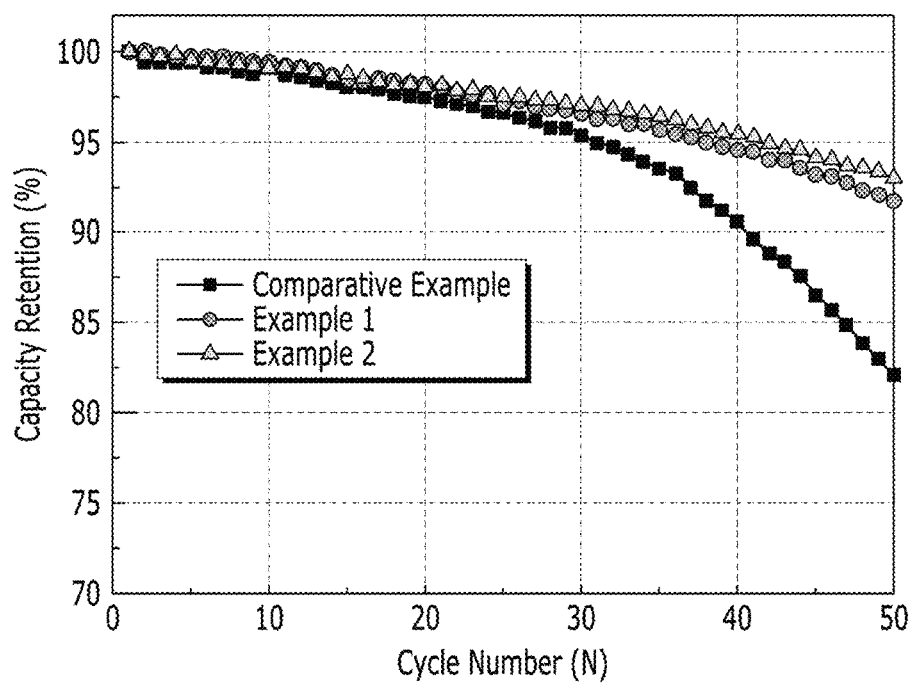
FIG. 4 is a graph of a capacity retention rate measured at an upper voltage limit of 4.5 V at 45° C. during 50 cycles according to Experimental Example 2.

Capacity retention rates of the respective coin-type half cells thus manufactured were measured at 45° C. and an upper voltage limit of 4.5 V during 50 cycles. The results are shown in the following Table 1 and FIG. 4.

TABLE 1

|  | Example 1 | Example 2 | Comparative Example 1 |
|---|---|---|---|
| Capacity retention rate (%) | 91.8 | 93.1 | 82.2 |

Referring to Table 1, Examples 1 and 2 showed that the coating layer including $LiBF_4$ was formed on the surface of the lithium cobalt oxide core to improve surface stability even at a high voltage of 4.5 V, and thus the capacity retention rate was 90% or more, specifically, 91.8% or more even after 50 cycles. In contrast, Comparative Example 1 showed that the coating layer was not formed on the surface of the lithium cobalt oxide, and the surface was unstable at a high voltage of 4.5 V, and the capacity retention rate was 82.2%, which was remarkably lower than those of Examples.

Although the present invention has been described in connection with the exemplary embodiments of the present invention, it will be apparent to those skilled in the art that various modifications and changes may be made thereto from the foregoing description without departing from the scope of the present invention.

INDUSTRIAL APPLICABILITY

As described above, the positive electrode active material particle according to the present invention includes a core containing lithium cobalt oxide represented by $Li_{1+x}Co_{1-x}O_2$ (−0.03≤x≤0.1); and a coating layer containing boron (B) and fluorine (F), which is formed on the surface of the core, thereby improving surface stability of the positive electrode active material particle, reducing side reactions on the surface of the positive electrode active material, and improving high-temperature lifetime characteristic.

The invention claimed is:

1. A positive electrode active material particle, comprising a core including lithium cobalt oxide represented by the following Chemical Formula 1; and
a coating layer including boron (B) and fluorine (F), which is coated on the surface of the core:

$$Li_{1+x}Co_{1-x}O_2 \quad (1)$$

wherein −0.03≤x≤0.1, and
wherein lithium in the core is in an excessive amount.
2. The positive electrode active material particle of claim 1, wherein in the coating layer, the boron and fluorine form a chemical bond with lithium.
3. The positive electrode active material particle of claim 1, wherein the boron and fluorine form a chemical bond with lithium of the core.
4. The positive electrode active material particle of claim 1, wherein the boron and fluorine exist in a compound of forming a chemical bond with lithium, independently of the core.
5. The positive electrode active material particle of claim 2, wherein the boron and fluorine, together with lithium, exist as $LiBF_4$.
6. The positive electrode active material particle of claim 1, wherein a weight of the coating layer is 0.5% by weight to 5% by weight with respect to a weight of the core.
7. The positive electrode active material particle of claim 1, wherein the positive electrode active material particle exhibits a capacity retention rate of 90% or more, as measured in a coin-type half cell at an upper voltage limit of 4.5 V at 45° C. during 50 cycles.
8. A method of preparing a positive electrode active material particle for a secondary battery, the method comprising:
(a) preparing a first lithium cobalt oxide represented by the following Chemical Formula 2;

$$Li_{1+y}Co_{1-y}O_2 \quad (2)$$

(wherein −0.03≤y≤0.1)
(b) dry-mixing the first lithium cobalt oxide and a first compound including all of boron and fluorine, or dry-mixing the first lithium cobalt oxide, a second compound including boron, and a third compound including fluorine; and
(c) heat-treating the mixture after the dry-mixing of (b).
9. The method of claim 8, wherein the first compound is one or more selected from the group consisting of $NH_4BF_4$, $NaBF_4$, $(CH_3)_3O(BF_4)$, $(C_2H_5)_4N(BF_4)$, $(C_6H_5)_3C(BF_4)$, $(CH_3)_4N(BF_4)$, $(CH_3CH_2CH_2)_4N(BF_4)$, and $C_3H_{10}BF_4P$.

10. The method of claim 8, wherein the second compound is one or more selected from the group consisting of $B_2O_3$, $H_3BO_3$, $(C_6H_5O)_3B$, $B_2H_4O_4$, $C_6H_5B(OH)_2$, $CH_3OC_6H_4B(OH)_2$, and $C_6H_{12}BNO_3$.

11. The method of claim 8, wherein the third compound is one or more selected from the group consisting of $NH_4HF_2$, $NH_4F$, $(CH_3)_4NF$, $(CH_3CH_2)_4NF$, PVdF (polyvinylidene fluoride), PVdF-HFP (poly(vinylidene fluoride-co-hexafluoropropylene)), PVF (polyvinyl fluoride), PTFE (polytetrafluoroethylene) and ETFE (ethylene tetrafluoroethylene).

12. The method of claim 8, wherein the dry-mixing of (b) is performed by high energy milling.

13. The method of claim 8, wherein the heat-treatment of (c) is performed at 300° C. to 600° C.

14. The method of claim 8, wherein the heat-treatment of (c) is performed at 450° C. to 500° C.

15. The method of claim 8, wherein the heat-treatment of (c) is performed for 3 hours to 7 hours.

16. A secondary battery comprising a positive electrode including the positive electrode active material particle of claim 1, a negative electrode, and an electrolyte.

17. The secondary battery of claim 16, wherein the electrolyte includes $LiPF_6$ as a lithium salt, and $PF_5$ which is a decomposition product of $LiPF_6$ reacts with a coating layer of the positive electrode active material particle to be converted into $PF_6^-$ which is a less reactive anion than $PF_5$.

18. The secondary battery of claim 16, wherein at least part of the coating layer of the positive electrode active material particle is dissolved into the electrolyte.

19. A battery pack comprising the secondary battery of claim 16.

20. A device comprising the battery pack of claim 19.

21. A positive electrode active material particle, comprising
 a core including lithium cobalt oxide represented by the following Chemical Formula 1; and
 a coating layer including boron (B) and fluorine (F), which is coated on the surface of the core:

$$Li_{1+x}Co_{1-x}O_2 \qquad (1)$$

wherein $-0.03 \leq x \leq 0.1$, and
wherein a weight of the coating layer is 0.5% by weight to 5% by weight with respect to a weight of the core.

* * * * *